UNITED STATES PATENT OFFICE.

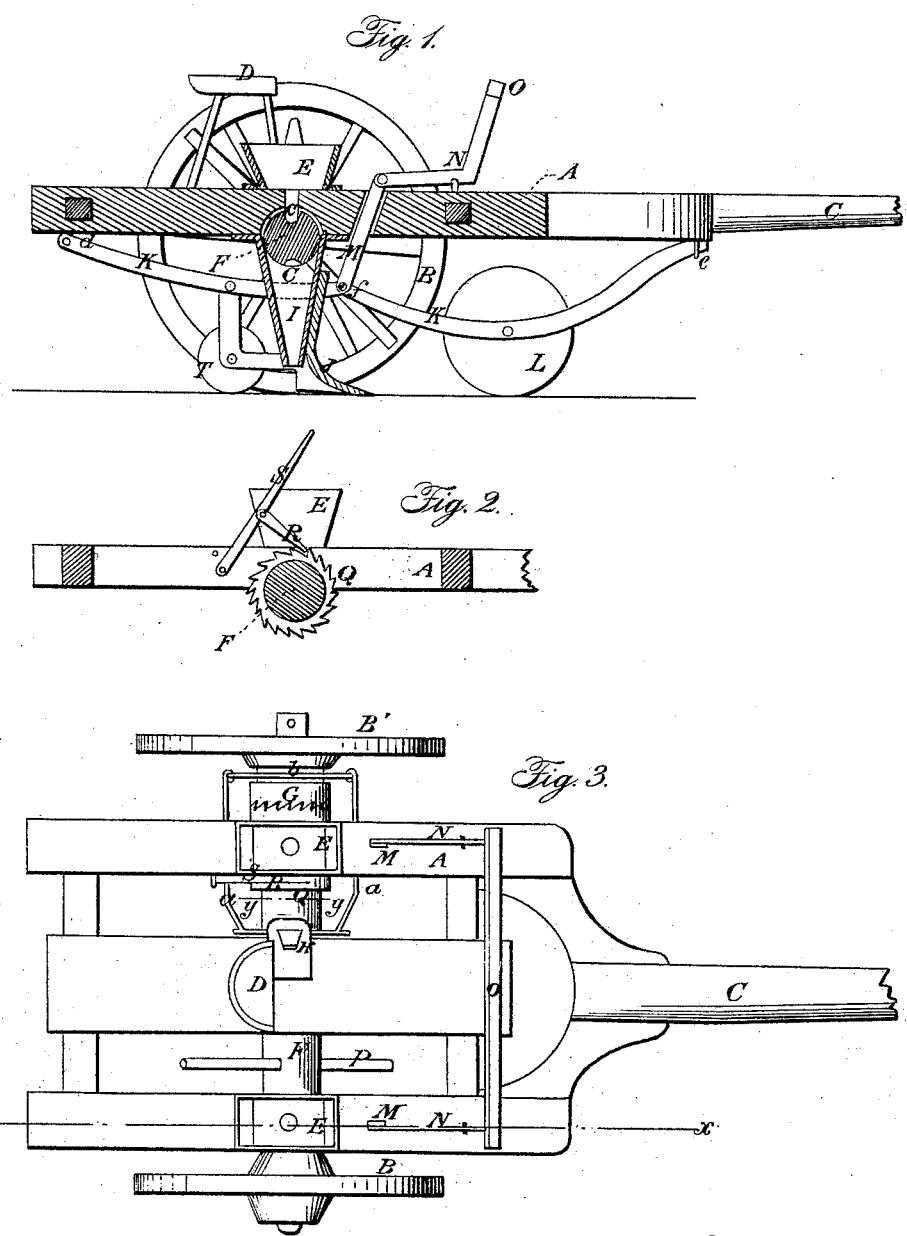

BARNABAS CLARK, OF MACKINAW, ILLINOIS.

IMPROVEMENT IN CORN-PLANTERS.

Specification forming part of Letters Patent No. 57,676, dated September 4, 1866.

*To all whom it may concern:*

Be it known that I, BARNABAS CLARK, of Mackinaw, in the county of Tazewell and State of Illinois, have invented a new and Improved Corn-Planter; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x$ $x$, Fig. 3; Fig. 2, a side sectional view of the same, taken in the line $y$ $y$, Fig. 3; Fig. 3, a plan or top view of the same.

Similar letters of reference indicate corresponding parts.

This invention relates to a new and improved machine for planting corn in hills or check-rows, and without any previous furrowing of the ground.

The object of the invention is to obtain a simple device for the purpose, and one whose parts will be under the complete control of the driver or operator, and be capable of being rendered operative and inoperative when desired with the greatest facility.

A represents a frame, which is mounted on two wheels, B B', and has a draft-pole, C, attached to it. D is the driver's seat, placed on the frame A; and E E are two seed-boxes placed upon it, one at each side, said boxes being directly over the axle F of the wheels B B'. The axle F is allowed to turn freely in its bearings, and the wheels B B' are placed loosely on the axle, one of the wheels, B, always being loose upon it, while the other wheel, B', may be connected with the axle when required by means of a clutch, G, one part of which is on the hub of wheel B', and the other part secured on the axle, the wheel B' being moved on the axle in order to connect or engage the two parts of the clutch. The wheel B' may be thus moved through the medium of a lever, H, connected with the hub of wheel B' by means of rods $a$ $a$, and a semicircular collar, $b$, fitting in a groove in the hub.

The axle F, directly underneath the two seed-boxes E E, has two seed-cells, $c$ $c$, made in it at opposite points, and when the axle is rotated by throwing the wheel B' in connection with it these cells discharge the seed from the boxes into tubes I I, which have furrow-openers J at their lower ends, the tubes I conveying the seed into said furrows.

The openers J J are attached to and held in position by bars K K' at the under side of the frame A. The bars K are attached at one end, by joints $d$, to the rear part of frame A, and the bars K', at their outer ends, are fitted in staples or eyes $e$ at the front part of frame A, and allowed to slide freely therein. The inner ends of the bars K K' are connected by a rod, $f$, forming a joint, and the inner parts of said bars are divaricated, or they may be formed of two pieces placed side by side and spread apart, the openers J J being connected by pivots to the parts of the bars K'.

In the bars K rotary colters L are placed, and the bars K K', at each side of the machine, are connected by rods or links M to the lower arms of bent levers N, which have their fulcra on the frame A. The upper ends of the levers N are connected by a bar, O, which serves as a foot-piece for the feet of the driver to act against.

At any time when it is not desired that furrows should be made the driver forces out the bar O, and thereby elevates the furrow-shares above the surface of the ground. The colters L are also raised free from the ground at the same time.

The seed-distributing device is rendered inoperative by throwing the wheel B' out of gear with the axle F.

P is a marker, composed of a bar passing through the axle F. This bar is of such a length that each end will mark the ground as the axle rotates, a mark being made each time a dropping takes place.

On the axle F there is secured a ratchet, Q, into which a pawl, R, attached to a lever, S, is made to engage whenever it is necessary to turn the axle in order to bring the seed-cells $c$ $c$ in proper position to drop the seed in line with adjoining rows. This operation is performed at the ends of rows, or rather in commencing new rows at the end of a field, and it enables the driver to plant the seed in check-rows, so that the corn may be placed both ways. The bars K are supported by rollers T, which serve as seed-coverers.

Having thus described my invention, I claim as new and desire to secure by Letters Patent—

1. The clutch G, in combination with the axle F, cells $c$, and wheels B B', arranged and operating in the manner and for the purpose herein specified.

2. The marker P, when applied to or used in combination with the loose axle F, substantially as and for the purpose specified.

3. The attaching of the openers J and colters L to the bars K K', applied to the frame A, and connected with a foot-bar, O, substantially as and for the purpose set forth.

4. The ratchet Q on the loose axle F, in connection with the pawl R, attached to lever S, when said parts are used in combination with the marker P, and the seed-distributing device, all arranged substantially as and for the purpose specified.

BARNABAS CLARK.

Witnesses:
   D. A. THALIMER,
   EDMUND MILLER.